US012444521B2

(12) United States Patent
Ke

(10) Patent No.: US 12,444,521 B2
(45) Date of Patent: Oct. 14, 2025

(54) CABLE ASSEMBLY WITH IMPROVED STRUCTURAL RELIABILITY, CABLE CONNECTOR AND METHOD FOR MAKING THE SAME

(71) Applicant: LANTO ELECTRONIC LIMITED, Kunshan (CN)

(72) Inventor: Bo Ke, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 291 days.

(21) Appl. No.: 18/244,070

(22) Filed: Sep. 8, 2023

(65) Prior Publication Data

US 2025/0062055 A1 Feb. 20, 2025

(30) Foreign Application Priority Data

Aug. 15, 2023 (CN) ........................ 202311024300.9

(51) Int. Cl.

*H01B 13/26* (2006.01)
*H01B 13/00* (2006.01)
*H01B 13/32* (2006.01)
*H01R 9/24* (2006.01)

(52) U.S. Cl.

CPC ..... *H01B 13/2606* (2013.01); *H01B 13/0036* (2013.01); *H01B 13/322* (2013.01); *H01R 9/2416* (2013.01)

(58) Field of Classification Search

CPC ............ H01B 13/2606; H01B 13/0036; H01B 13/322; H01R 9/11; H01R 13/5845; H01R 9/03; H01R 9/2416; H01R 13/405; H01R 13/6592; H01R 13/6658; H01R 24/60

USPC ........................................................ 174/68.1

See application file for complete search history.

(56) References Cited

U.S. PATENT DOCUMENTS

| | | | | |
|---|---|---|---|---|
| 9,640,919 | B2 | 5/2017 | Loveless et al. | |
| 2005/0133245 | A1* | 6/2005 | Katsuyama .......... | H01R 13/719 174/75 C |
| 2011/0189900 | A1* | 8/2011 | Su ...................... | H01R 13/6593 439/741 |

(Continued)

FOREIGN PATENT DOCUMENTS

| | | | |
|---|---|---|---|
| CN | 213660689 | U | 7/2021 |
| JP | 59-20917 | A | 2/1984 |

(Continued)

*Primary Examiner* — Timothy J Thompson
*Assistant Examiner* — Michael F Mcallister
(74) *Attorney, Agent, or Firm* — Birch, Stewart, Kolasch & Birch, LLP

(57) ABSTRACT

A cable assembly includes a number of wires, a covering layer, a braiding layer and a fixing block. Each wire includes a core for conducting electricity and an insulating layer wrapped on the core. The covering layer is wrapped on the plurality of wires. The braiding layer is wrapped on the covering layer. The fixing block is injection-molded on the braiding layer. A material of the fixing block at least partially penetrates into the braiding layer so as to integrate the braiding layer and the covering layer as a whole. With such arrangement, the structural reliability of the cable assembly of the present disclosure is relatively high. A cable connector having the cable assembly and a method of manufacturing the cable assembly are also disclosed.

20 Claims, 7 Drawing Sheets

(56) References Cited

U.S. PATENT DOCUMENTS

| | | | | | |
|---|---|---|---|---|---|
| 2012/0002930 | A1* | 1/2012 | Lin | G02B 6/3817 | 385/101 |
| 2013/0178102 | A1* | 7/2013 | Wu | H01R 12/61 | 439/620.04 |
| 2016/0079689 | A1* | 3/2016 | Wu | B23K 26/32 | 228/180.21 |
| 2019/0052032 | A1* | 2/2019 | Wu | H05K 1/111 | |
| 2019/0288418 | A1* | 9/2019 | Zhong | H01R 12/53 | |

FOREIGN PATENT DOCUMENTS

| | | | |
|---|---|---|---|
| JP | 62-193624 | U | 12/1987 |
| JP | 3168994 | U | 7/2011 |
| JP | 2013-65408 | A | 4/2013 |
| JP | 2014-143002 | A | 8/2014 |
| JP | 2016-10262 | A | 1/2016 |
| JP | 2017-220314 | A | 12/2017 |
| JP | 2017-220315 | A | 12/2017 |
| JP | 2018-26350 | A | 2/2018 |
| JP | 2019-102275 | A | 6/2019 |
| JP | 2021-29852 | A | 3/2021 |
| JP | 2023-538729 | A | 9/2023 |
| TW | 201421819 | A | 6/2014 |
| TW | 201711285 | A | 3/2017 |
| TW | M656896 | U | 6/2024 |
| WO | WO 2013/094627 | A1 | 6/2013 |

* cited by examiner

CABLE ASSEMBLY WITH IMPROVED STRUCTURAL RELIABILITY, CABLE CONNECTOR AND METHOD FOR MAKING THE SAME

CROSS-REFERENCE TO RELATED APPLICATION

This patent application claims priority of a Chinese Patent Application No. 202311024300.9, filed on Aug. 15, 2023 and titled "CABLE ASSEMBLY, CABLE CONNECTOR AND METHOD FOR MAKING THE SAME", the entire content of which is incorporated herein by reference.

TECHNICAL FIELD

The present disclosure relates to a cable assembly, a cable connector and a method for making the same, which belongs to a technical field of connectors.

BACKGROUND

A cable connector in the related art generally includes a connector and a cable assembly connected to the connector. The cable assembly generally includes a plurality of wires and a covering layer wrapped on the plurality of wires. The covering layer is usually a thermoplastic polyurethane (TPU) covering layer.

With the development of technology, in order to obtain better vision, touch, safety and service life, the related technology is researching to wrap a braiding layer on the covering layer. However, because the structure of the braiding layer is soft, the scalability is strong, and the adhesion between the braiding layer and the covering layer is very small, the braiding layer is easy to slide on the covering layer, which leads to shrinkage of the cable assembly during a front-end processing stage, affecting the appearance and related functions of the product.

SUMMARY

An object of the present disclosure is to provide a cable assembly with improved structural reliability, a cable connector having the cable assembly, and a method of making the cable assembly.

In order to achieve the above object, the present disclosure adopts the following technical solution: a cable assembly, including: a plurality of wires, each wire including a core for conducting electricity and an insulating layer circumferentially wrapped on the core; a covering layer circumferentially wrapped on the plurality of wires; a braiding layer circumferentially wrapped on the covering layer; and a fixing block injection molded on the braiding layer; a material of the fixing block at least partially penetrating into the braiding layer so as to integrate the braiding layer and the covering layer into a whole.

In order to achieve the above object, the present disclosure adopts the following technical solution: a cable connector, including: a connector; and a cable assembly including: a plurality of wires, each wire including a core for conducting electricity and an insulating layer circumferentially wrapped on the core; a covering layer circumferentially wrapped on the plurality of wires; a braiding layer circumferentially wrapped on the covering layer; and a fixing block injection molded on the braiding layer; a material of the fixing block at least partially penetrating into the braiding layer so as to integrate the braiding layer and the covering layer into a whole; wherein the cores of the plurality of wires are electrically connected to the connector directly or indirectly.

In order to achieve the above object, the present disclosure adopts the following technical solution: a method of manufacturing a cable assembly, including: providing a carrier, the carrier defining a plurality of wire positioning grooves and a molding groove communicating with the plurality of wire positioning grooves; providing a cable, the cable including a plurality of wires, a covering layer circumferentially wrapped on the plurality of wires and a braiding layer circumferentially wrapped on the covering layer; each wire including a core for conducting electricity and an insulating layer circumferentially wrapped on the core; installing the plurality of wires of the cable in the plurality of wire positioning grooves, and making a first end of the covering layer and a second end of the braiding layer extending into the molding groove; providing a molding die and installing the molding die on the carrier; the molding die including an injection port and an injection runner; wherein the injection runner communicates with the injection port and the molding groove; and injecting a liquid filling material into the injection port so that the liquid filling material is injected into the molding groove through the injection runner, and the liquid filling material penetrates into the braiding layer; wherein after the liquid filling material is solidified, the braiding layer, the covering layer and the filling material are integrated into a whole.

Compared with the prior art, the present disclosure provides the fixing block injection-molded on the braiding layer. The material of the fixing block at least partially penetrates into the braiding layer so as to integrate the braiding layer and the covering layer as a whole. By providing the fixing block, the braiding layer and the covering layer can be tightly fixed, thereby preventing the braiding layer from shrinking due to sliding relative to the covering layer.

DETAILED DESCRIPTION

Figure 1:
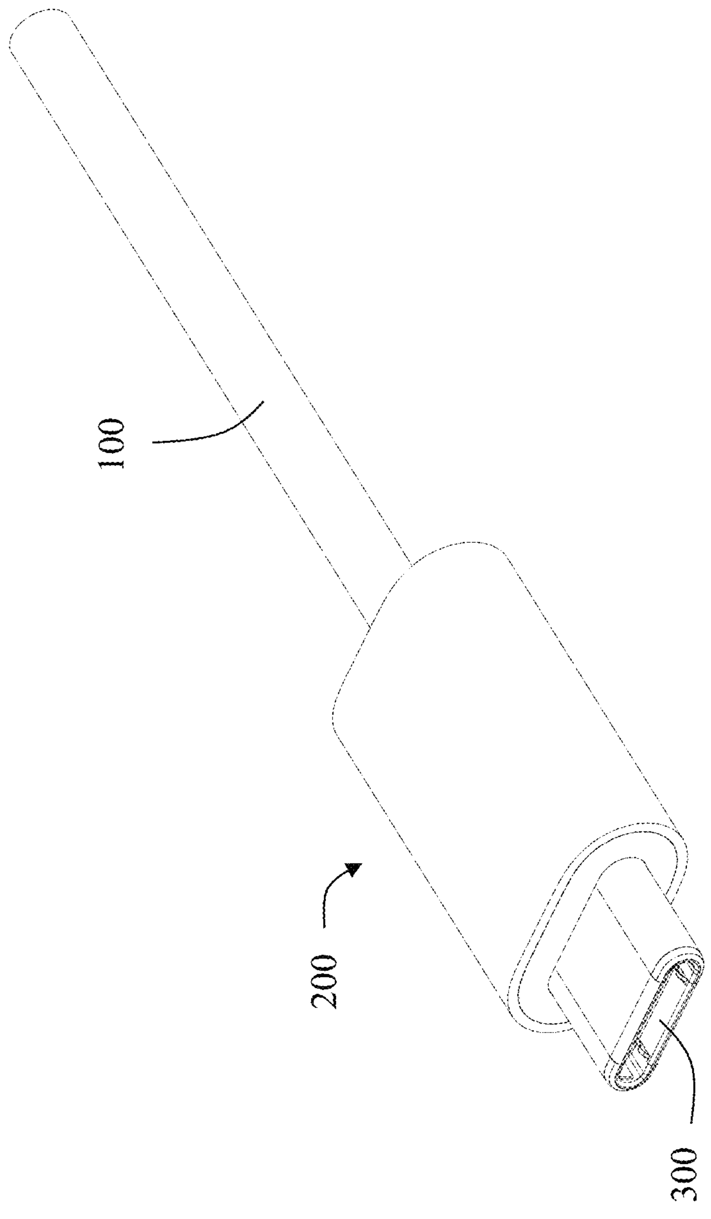
FIG. 1 is a schematic perspective view of a cable connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 6, the present disclosure discloses a cable assembly 100, which includes a plurality of wires 1, a covering layer 2 circumferentially wrapped on the plurality of wires 1, a braiding layer 3 circumferentially wrapped on the cover layer 2, and a fixing block 4 injection-molded on the braiding layer 3. A material of the fixing block 4 at least partially penetrates into the braiding layer 3 so as to integrate the braiding layer 3 and the covering layer 2 into a whole.

In the illustrated embodiment of the present disclosure, each wire 1 includes a core 11 for conducting electricity and an insulating layer 12 circumferentially wrapped on the core 11.

Specifically, each wire 1 includes a protruding wire portion 111. The protruding wire portion 111 protrudes beyond a first end 21 of the covering layer 2 and a second end 31 of the braiding layer 3. The fixing block 4 is at least partially molded on the first end 21, the second end 31 and a root 112 of the protruding wire portion 111. The root 112 of the protruding wire portion 111 is a portion of the protruding wire portion 111 that is located adjacent to the first end 21 and the second end 31. The fixing block 4 is at least partially molded on the insulating layer 12 of the protruding wire portion 111, and covers both the first end 21 of the covering layer 2 and the second end 31 of the braiding layer 3.

In the illustrated embodiment of the present disclosure, at least part of the protruding wire portions 111 of the plurality of wires 1 includes a bent portion 1111 and an extending portion 1112 extending from the bent portion 1111. The fixing block 4 is molded on the bent portion 1111 of the protruding wire portion 111 so as to maintain mutual positions of the extending portions 1112. In the illustrated embodiment of the present disclosure, the covering layer 2 is cylindrical and circumferentially accommodates the plurality of wires 1 therein. As to the extending portions 1112, the extending portions 1112 of the plurality of wires 1 are disposed at intervals in sequence (for example, disposed at intervals along a left-right direction). The mutual positions of the extending portions 1112 include but not limited to the distance among the extending portions 1112 of the plurality of wires 1 and the flatness of the extending portions 1112 of the plurality of wires 1.

In the illustrated embodiment of the present disclosure, the covering layer 2 is a silica gel covering layer. The braiding layer 3 is a PET (Polyethylene Terephthalate) braiding layer. The fixing block 4 is a polyamide fixing block, an acrylic resin fixing block or an epoxy resin fixing block. When the fixing block 4 is the polyamide fixing block, once the molding is unqualified, it can be processed by alcohol and then reproduced. Polyamide is insoluble in alcohol, but it will soften under the action of alcohol, which facilitates the disassembly of the unqualified polyamide fixing block.

Figure 2:
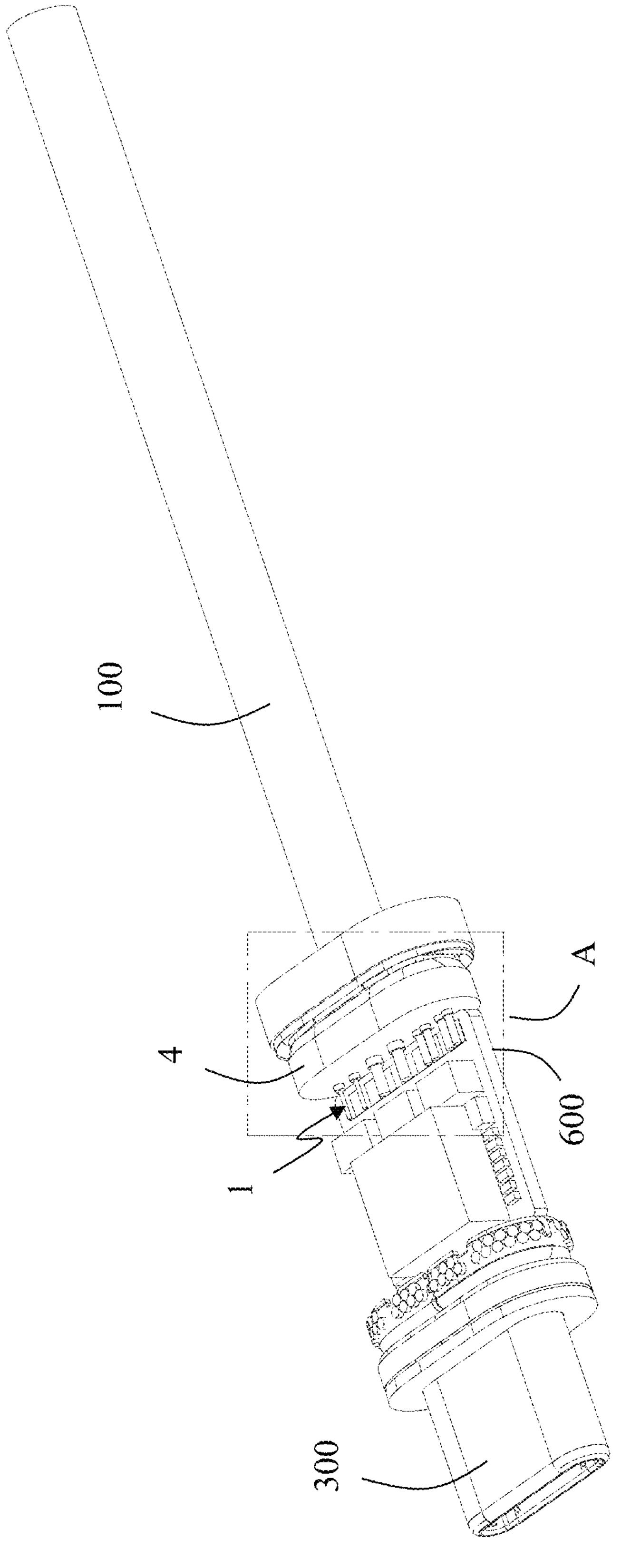
FIG. 2 is a perspective schematic view after removing an outer shell in FIG. 1.
Figure 3:
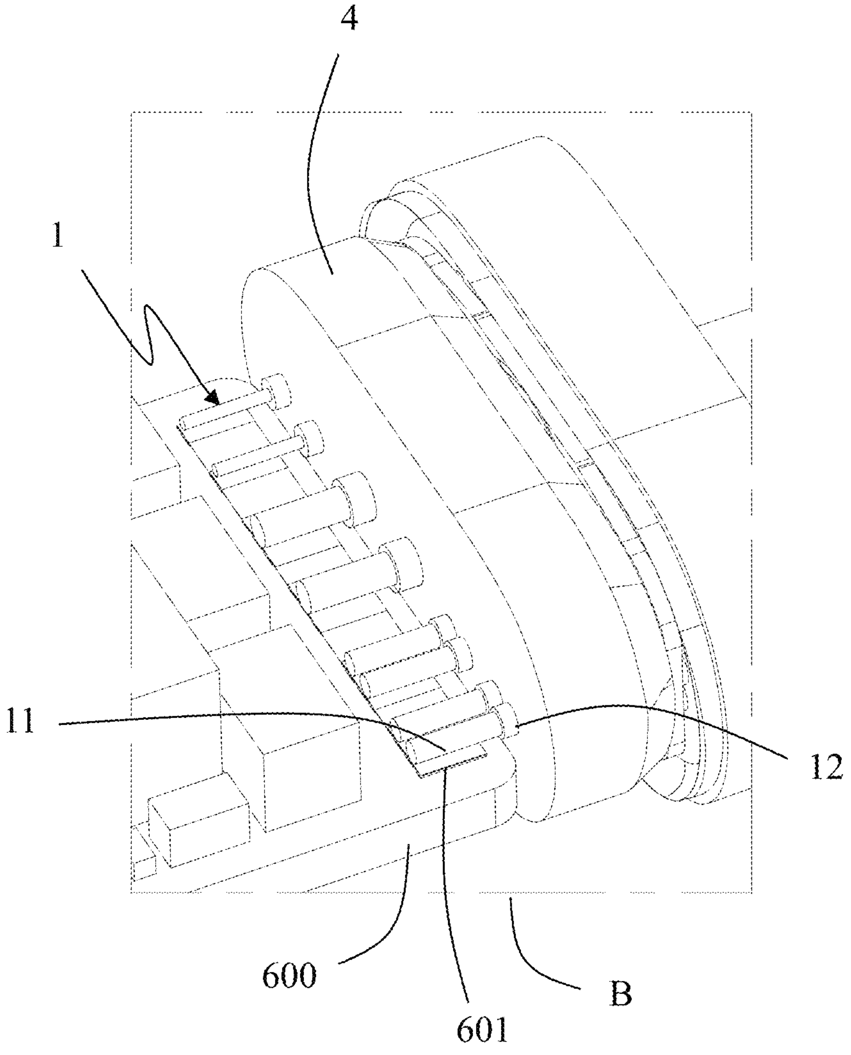
FIG. 3 is a partial enlarged view of a frame part A in FIG. 2.
Figure 4:
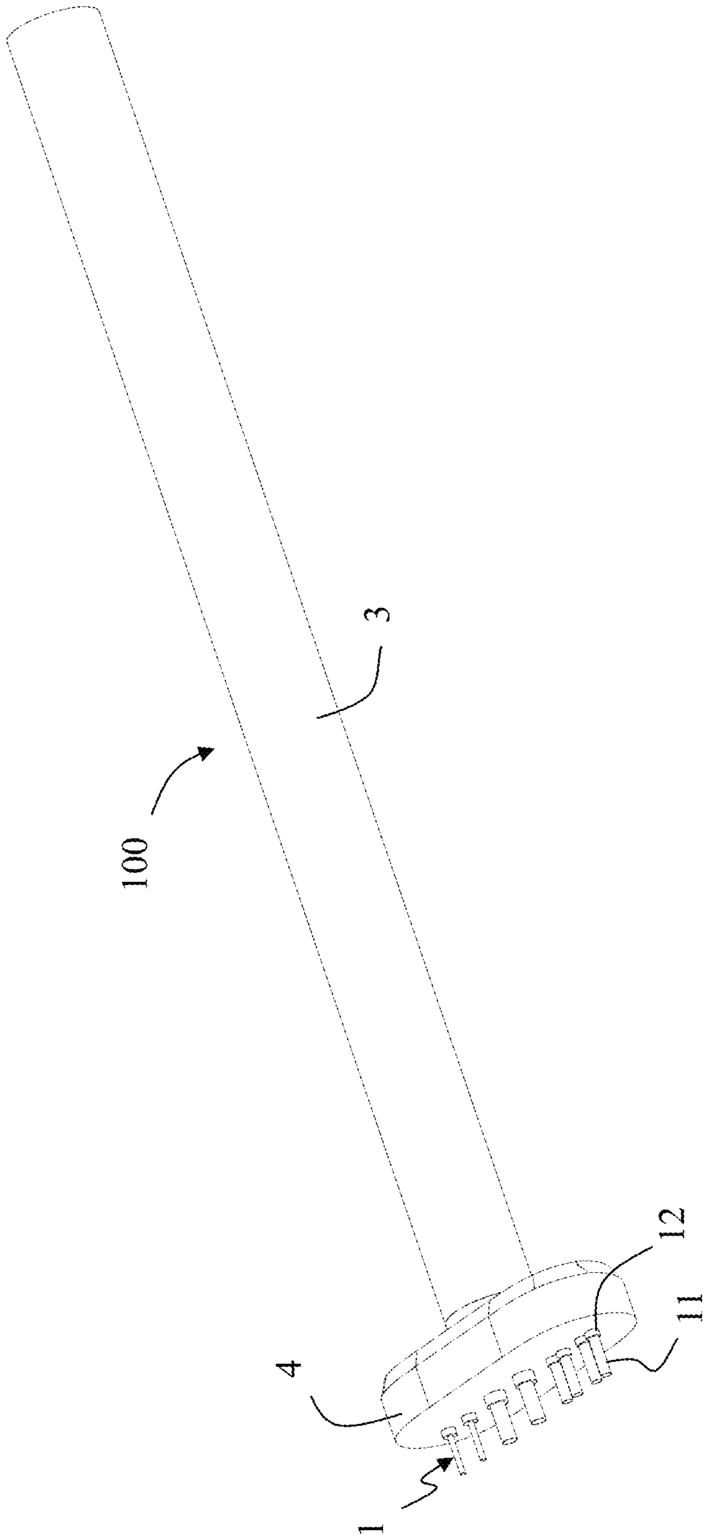
FIG. 4 is a perspective schematic view of a cable assembly in accordance with an embodiment of the present disclosure.
Figure 5:
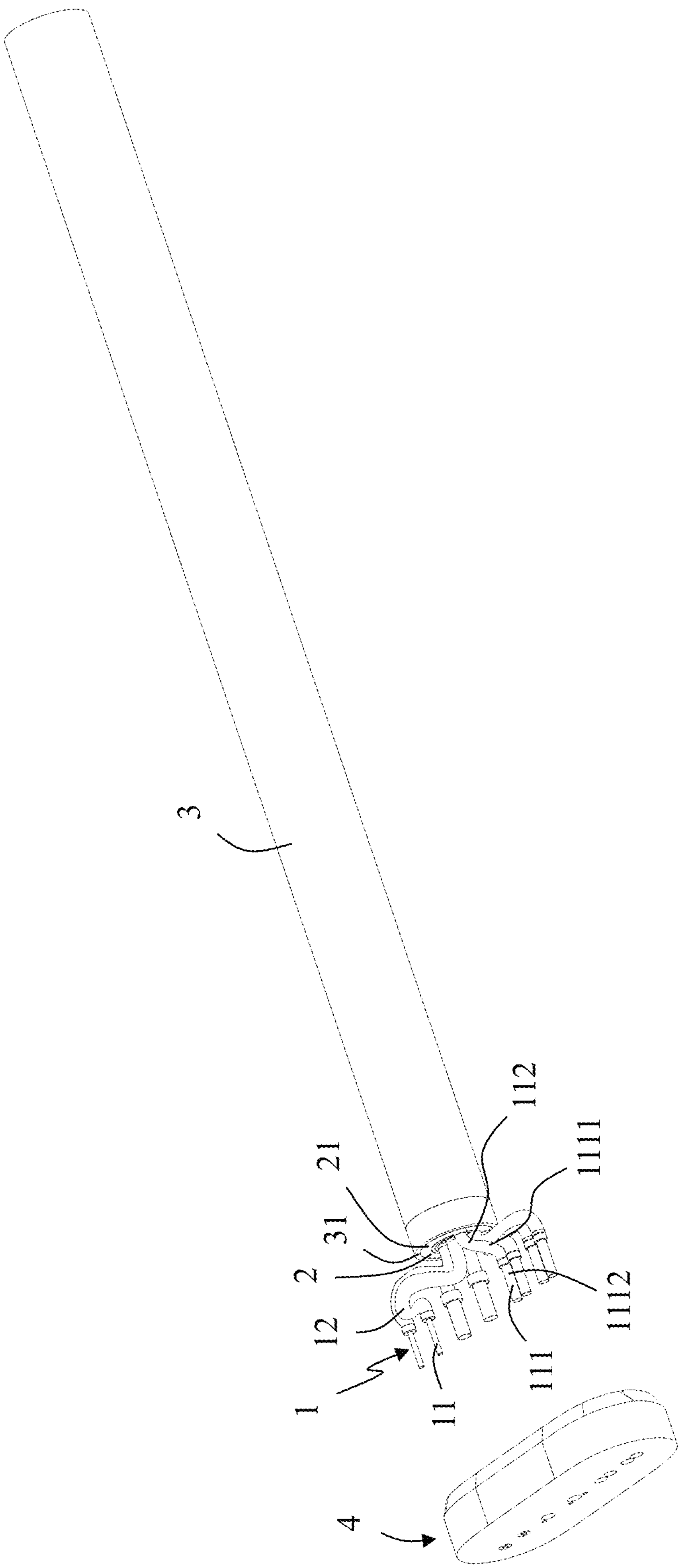
FIG. 5 is a perspective exploded view of FIG. 4.
Figure 6:
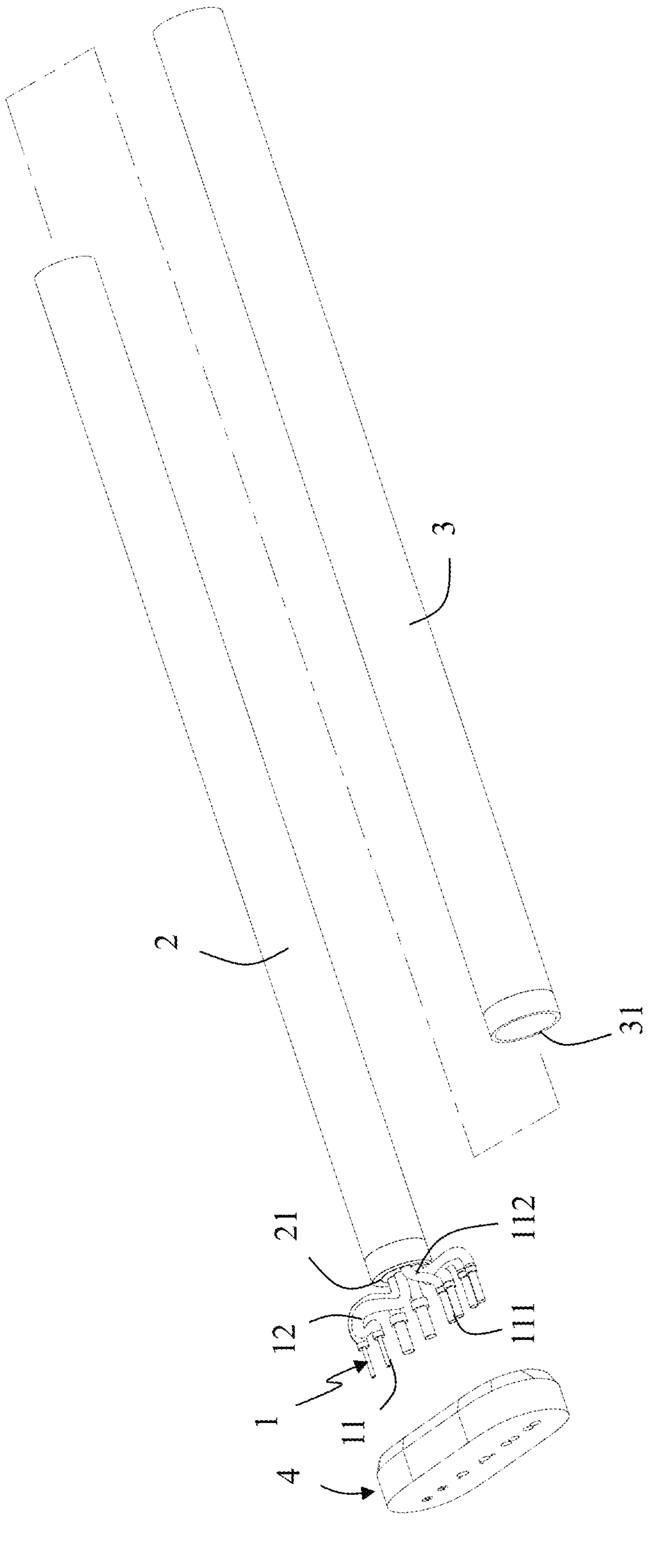
FIG. 6 is a further perspective exploded view of FIG. 5.
Figure 7:
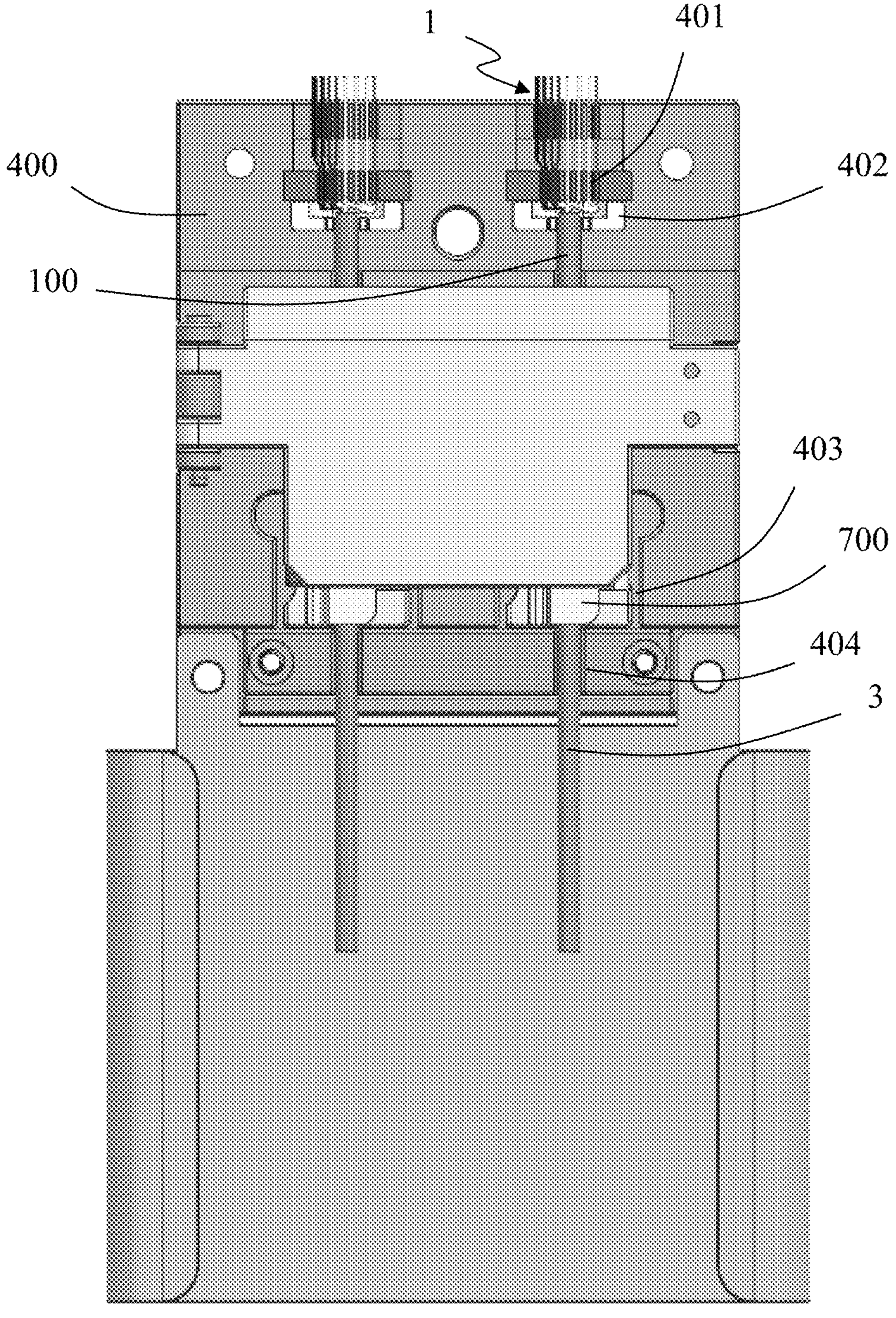
FIG. 7 is a top view when a cable of the present disclosure is installed on a carrier.

The present disclosure discloses a cable connector 200, which includes a connector 300 and the aforementioned cable assembly 100. The cores 11 are electrically connected to the connector 300 directly or indirectly. For example, the cores 11 of the cable assembly 100 are soldered or welded to the connector 300. Alternatively, the cores 11 of the cable assembly 100 are connected to the connector 300 through a built-in circuit board 600 (as shown in FIG. 2). Referring to FIG. 3, the built-in circuit board 600 includes a plurality of conductive pads 601. The cores 11 of the cable assembly 100 are fixed to corresponding conductive pads 601, by soldering or welding.

Besides, referring to FIG. 4 to FIG. 7, the present disclosure further discloses a method of manufacturing the cable assembly 100, including:

- providing a carrier 400, the carrier defining a plurality of wire positioning grooves 401 and a molding groove 402 communicating with the plurality of wire positioning grooves 401;
- providing a cable, the cable comprising a plurality of wires 1, a covering layer 2 circumferentially wrapped on the plurality of wires 1 and a braiding layer 3 circumferentially wrapped on the covering layer 2; each wire 1 comprising a core 11 for conducting electricity and an insulating layer 12 circumferentially wrapped on the core 11;
- installing the plurality of wires 1 of the cable in the plurality of wire positioning grooves 401, and making a first end of the covering layer 2 and a second end of the braiding layer 3 extending into the molding groove 402;
- providing a molding die (not shown) and installing the molding die on the carrier 400; the molding die comprising an injection port and an injection runner; wherein the injection runner communicates with the injection port and the molding groove 402; and
- injecting a liquid filling material into the injection port so that the liquid filling material is injected into the molding groove 402 through the injection runner, and the liquid filling material penetrates into the braiding layer 3.

After the liquid filling material is solidified, the molding die and the carrier 400 are removed to obtain the aforementioned cable assembly 100.

In the illustrated embodiment of the present disclosure, before installing the plurality of wires 1 of the cable in the plurality of wire positioning grooves 401, the method further includes:

- providing a wire clip 700 and fixing the wire clip 700 on the braiding layer 3; and
- performing laser cutting on the covering layer 2 and the braiding layer 3 to obtain a required length and expose the protruding wire portions 111;

The carrier 400 further defines a positioning groove 403 for positioning the wire clip 700 and a positioning slot 404 for positioning the braiding layer 3.

Preferably, in the illustrated embodiment of the present disclosure, two sets of the cable assemblies 100 can be injection-molded by means of the carrier 400 and the molding die at the same time, so as to improve production efficiency.

When the liquid filling material is injected into the injection port, a temperature of the liquid filling material is T, where T≤260° C.; a viscosity of the liquid filling material is η, where η≤5000 mPa·s. It is understandable to those skilled in the art that by setting the temperature T of the filling material to be less than or equal to 260° C., damage to the braiding layer 3 and/or the covering layer 2 due to high temperature can be avoided. Preferably, 210° C.≤T≤260° C.; 1 mPa·s≤η≤2000 mPa·s. The inventors of the present disclosure found through careful research that when 1 mPa·s≤η≤2000 mPa·s, the viscosity of the filling material can better penetrate into the braiding layer 3 to wrap the braiding layer 3 so that they are integrated into a whole.

Compared with the prior art, the present disclosure provides the fixing block 4 injection-molded on the braiding layer 3. The material of the fixing block 4 at least partially penetrates into the braiding layer 3, so that the braiding layer 3 and the covering layer 2 are integrated as a whole. By providing the fixing block 4, the braiding layer 3 and the covering layer 2 can be tightly fixed, thereby preventing the braiding layer 3 from shrinking back due to sliding relative to the covering layer 2. In addition, the fixing block 4 can fix the positions of the protruding wire portions 111 of the plurality of wires 1, so as to facilitate welding or soldering the cores 11 of the cable assembly 100 to the circuit board 600. It is understandable to those skilled in the art that by providing the fixing block 4 and integrating the braiding layer 3 and the covering layer 2 as a whole, it is beneficial to enhance the toughness and service life of the product. It is understandable to those of ordinary skill in the art that the material of the fixing block 4 at least partially penetrates into the braiding layer 3 and reach an outer circumferential surface of the covering layer 2, so that the fixing block 4 and the braiding layer 3 are integrated as a whole. In addition, by at least partially fixing the fixing block 4 on the insulating layers 12 of the protruding wire portions 111, the tensile resistance to the cores 11 is further enhanced.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A cable assembly, comprising:

a plurality of wires, each wire comprising a core for conducting electricity and an insulating layer circumferentially wrapped on the core;

a covering layer circumferentially wrapped on the plurality of wires;

a braiding layer circumferentially wrapped on the covering layer; and a fixing block injection molded on the braiding layer; a material of the fixing block at least partially penetrating into the braiding layer so as to integrate the braiding layer and the covering layer into a whole.

2. The cable assembly according to claim 1, wherein each wire comprises a protruding wire portion extending beyond a first end of the covering layer and a second end of the braiding layer; the fixing block is at least partially molded on the first end, the second end and a root of the protruding wire portion.

3. The cable assembly according to claim 2, wherein the root of the protruding wire portion is a portion of the protruding wire portion that is located adjacent to the first end and the second end; the fixing block is at least partially molded on the insulating layer of the protruding wire portion.

4. The cable assembly according to claim 3, wherein at least part of the protruding wire portions of the plurality of wires comprises a bent portion and an extending portion extending from the bent portion; the fixing block is molded on the bent portion of the protruding wire portion, so as to maintain mutual positions of the extending portions.

5. The cable assembly according to claim 1, wherein the covering layer is a silica gel covering layer.

6. The cable assembly according to claim 1, wherein the braiding layer is a PET braiding layer.

7. The cable assembly according to claim 1, wherein the fixing block is a polyamide fixing block, an acrylic resin fixing block or an epoxy resin fixing block.

8. A cable connector, comprising:

a connector; and a cable assembly comprising:

a plurality of wires, each wire comprising a core for conducting electricity and an insulating layer circumferentially wrapped on the core;

a covering layer circumferentially wrapped on the plurality of wires;

a braiding layer circumferentially wrapped on the covering layer; and a fixing block injection molded on the braiding layer; a material of the fixing block at least partially penetrating into the braiding layer so as to integrate the braiding layer and the covering layer into a whole;

wherein the cores of the plurality of wires are electrically connected to the connector directly or indirectly.

9. The cable connector according to claim 8, wherein each wire comprises a protruding wire portion extending beyond a first end of the covering layer and a second end of the braiding layer; the fixing block is at least partially molded on the first end, the second end and a root of the protruding wire portion.

10. The cable connector according to claim 9, wherein the root of the protruding wire portion is a portion of the protruding wire portion that is located adjacent to the first end and the second end; the fixing block is at least partially molded on the insulating layer of the protruding wire portion.

11. The cable connector according to claim 10, wherein at least part of the protruding wire portions of the plurality of wires comprises a bent portion and an extending portion extending from the bent portion; the fixing block is molded on the bent portion of the protruding wire portion, so as to maintain mutual positions of the extending portions.

12. The cable connector according to claim 8, wherein the covering layer is a silica gel covering layer.

13. The cable connector according to claim 8, wherein the braiding layer is a PET braiding layer.

14. The cable connector according to claim 8, wherein the fixing block is a polyamide fixing block, an acrylic resin fixing block or an epoxy resin fixing block.

15. A method of manufacturing a cable assembly, comprising:

providing a carrier, the carrier defining a plurality of wire positioning grooves and a molding groove communicating with the plurality of wire positioning grooves;

providing a cable, the cable comprising a plurality of wires, a covering layer circumferentially wrapped on the plurality of wires and a braiding layer circumferentially wrapped on the covering layer; each wire comprising a core for conducting electricity and an insulating layer circumferentially wrapped on the core;

installing the plurality of wires of the cable in the plurality of wire positioning grooves, and making a first end of the covering layer and a second end of the braiding layer extending into the molding groove;

providing a molding die and installing the molding die on the carrier; the molding die comprising an injection port and an injection runner; wherein the injection runner communicates with the injection port and the molding groove; and injecting a liquid filling material into the injection port so that the liquid filling material is injected into the molding groove through the injection runner, and the liquid filling material penetrates into the braiding layer;

wherein after the liquid filling material is solidified, the braiding layer, the covering layer and the filling material are integrated into a whole.

16. The method according to claim 15, wherein when the liquid filling material is injected into the injection port, a temperature of the liquid filling material is T, where $T \leq 260°$ C.; a viscosity of the liquid filling material is $\eta$, where $\eta \leq 5000$ mPa·s.

17. The method according to claim 16, wherein $210° \text{ C.} \leq T \leq 260° \text{ C.}$; $1 \text{ mPa·s} \leq \eta \leq 2000$ mPa·s.

18. The method according to claim 15, wherein the covering layer is a silica gel covering layer.

19. The method according to claim 15, wherein the braiding layer is a PET braiding layer.

20. The method according to claim 15, wherein the liquid filling material is polyamide, acrylic resin or epoxy resin.

* * * * *